US012291026B2

(12) United States Patent
Jeuté

(10) Patent No.: US 12,291,026 B2
(45) Date of Patent: May 6, 2025

(54) METHOD AND SYSTEM FOR CONTROLLING DROP COLLISIONS IN A DROP ON DEMAND PRINTING APPARATUS

(71) Applicant: Piotr Jeuté, Warsaw (PL)

(72) Inventor: Piotr Jeuté, Warsaw (PL)

( * ) Notice: Subject to any disclaimer, the term of this patent is extended or adjusted under 35 U.S.C. 154(b) by 122 days.

(21) Appl. No.: 17/765,337

(22) PCT Filed: Oct. 1, 2020

(86) PCT No.: PCT/EP2020/077560
§ 371 (c)(1),
(2) Date: Mar. 30, 2022

(87) PCT Pub. No.: WO2021/064120
PCT Pub. Date: Apr. 8, 2021

(65) Prior Publication Data
US 2022/0371319 A1 Nov. 24, 2022

(30) Foreign Application Priority Data
Oct. 2, 2019 (EP) .................................... 19461587

(51) Int. Cl.
*B41J 2/045* (2006.01)

(52) U.S. Cl.
CPC ....... *B41J 2/04526* (2013.01); *B41J 2/04586* (2013.01)

(58) Field of Classification Search
CPC ...................................................... B41J 2/045
See application file for complete search history.

(56) References Cited

U.S. PATENT DOCUMENTS

2004/0130585 A1* 7/2004 Weksler ..................... B41J 2/09 347/12
2006/0003439 A1 1/2006 Ismagilov et al.
2010/0018584 A1 1/2010 Bransky et al.
2018/0029361 A1* 2/2018 Jeuté .................... B41J 2/04581

FOREIGN PATENT DOCUMENTS

CN 110201812 A * 9/2019 ............. B05B 15/00
CN 210434719 U * 5/2020 ............. B05B 15/00
EP 1219431 7/2002
JP 2002187293 A * 7/2002 .......... B41J 2/16508
WO WO/2010/128157 11/2010

OTHER PUBLICATIONS

Cong, MachineTranslationofCN-210434719-U, 2020 (Year: 2020).*
Qian, MachineTranslationofCN-110201812-A, 2019 (Year: 2019).*
Matsumoto, MachineTranslationofJP-2002187293-A, 2002 (Year: 2002).*
WIPO International Search Report and Written Opinion of the International Searching Authority.

* cited by examiner

*Primary Examiner* — Scott A Richmond
(74) *Attorney, Agent, or Firm* — Rivka Friedman

(57) ABSTRACT

A method for controlling drop collisions in a drop on demand printing apparatus, comprising discharging a first drop (101) from a first dispenser (111) to move along a first path (103) and discharging a second drop (102) from a second dispenser (112) to move along a second path (104) that crosses with the first path such that the drops are expected to collide and form a combined drop (105), characterized by: measuring the collision of the drops (101, 102); examining whether the collision was effected as expected; if the collision was not effected as expected, altering the parameters of dispensing of the drops (101, 102) from the dispensers (111, 112).

16 Claims, 3 Drawing Sheets

METHOD AND SYSTEM FOR CONTROLLING DROP COLLISIONS IN A DROP ON DEMAND PRINTING APPARATUS

FIELD

The present invention relates to controlling drop collisions in a drop on demand printing apparatus, wherein at least two drops are discharged to combine in flight. The method is applicable in particular to reactive inkjet printing or 3D printing methods.

BACKGROUND

Drop on demand is a well known inkjet printing technique, wherein a drop of ink is discharged from a nozzle towards a surface to be printed. The nozzle can be controlled to for example select appropriate discharge time, drop size, drop direction etc.

The drop on demand technique was recently proposed for additive manufacturing applications (also called 3D printing), for example in PCT applications WO2016135294 or WO2016135296, wherein at least two drops are discharged to combine in flight and coalesce into a combined drop.

In order for the drops to combine in flight, the nozzles must be controlled with a high precision. The drop flight parameters may depend on many factors, such as the ambient temperature, humidity, pressure, etc.

There is a need to provide a method that would allow precise control of the drop on demand coalescence process.

SUMMARY

There is disclosed a method for controlling drop collisions in a drop on demand printing apparatus, comprising discharging a first drop from a first dispenser to move along a first path and discharging a second drop from a second dispenser to move along a second path that crosses with the first path such that the drops are expected to collide and form a combined drop, characterized by: measuring the collision of the drops; examining whether the collision was effected as expected; if the collision was not effected as expected, altering the parameters of dispensing of the drops from the dispensers.

The collision can be measured by capturing an image of the combined drop.

The image can be captured by stroboscopic camera.

The collision can be measured by at least one laser and at least one detector configured to determine a change of intensity of light emitted by the lasers as the combined drop alters the path of light between the at least one laser and detector.

Examining whether the collision was effected as expected may include analyzing at least one of: geometrical parameter (X) of collided drops or Weber number.

Examining whether the collision was effected as expected may include analyzing of a path of flight of the combined drop.

The method may comprise altering at least one of: time of discharge of drop, speed of discharge of drop, drop size.

There is also disclosed a system for controlling drop collisions in a drop on demand printing apparatus, comprising a first dispenser for discharging a first drop to move along a first path and a second dispenser for discharging a second drop to move along a second path that crosses with the first path such that the drops are expected to collide and form a combined drop, the system comprising a collision analyzer configured to: measure the collision of the drops using a sensor; examine whether the collision was effected as expected; if the collision was not effected as expected, alter the parameters of dispensing of the drops from the dispensers via dispenser controllers.

BRIEF DESCRIPTION OF DRAWINGS

The present invention is shown by means of example embodiments on a drawing, in which.

DETAILED DESCRIPTION

Figure 1:
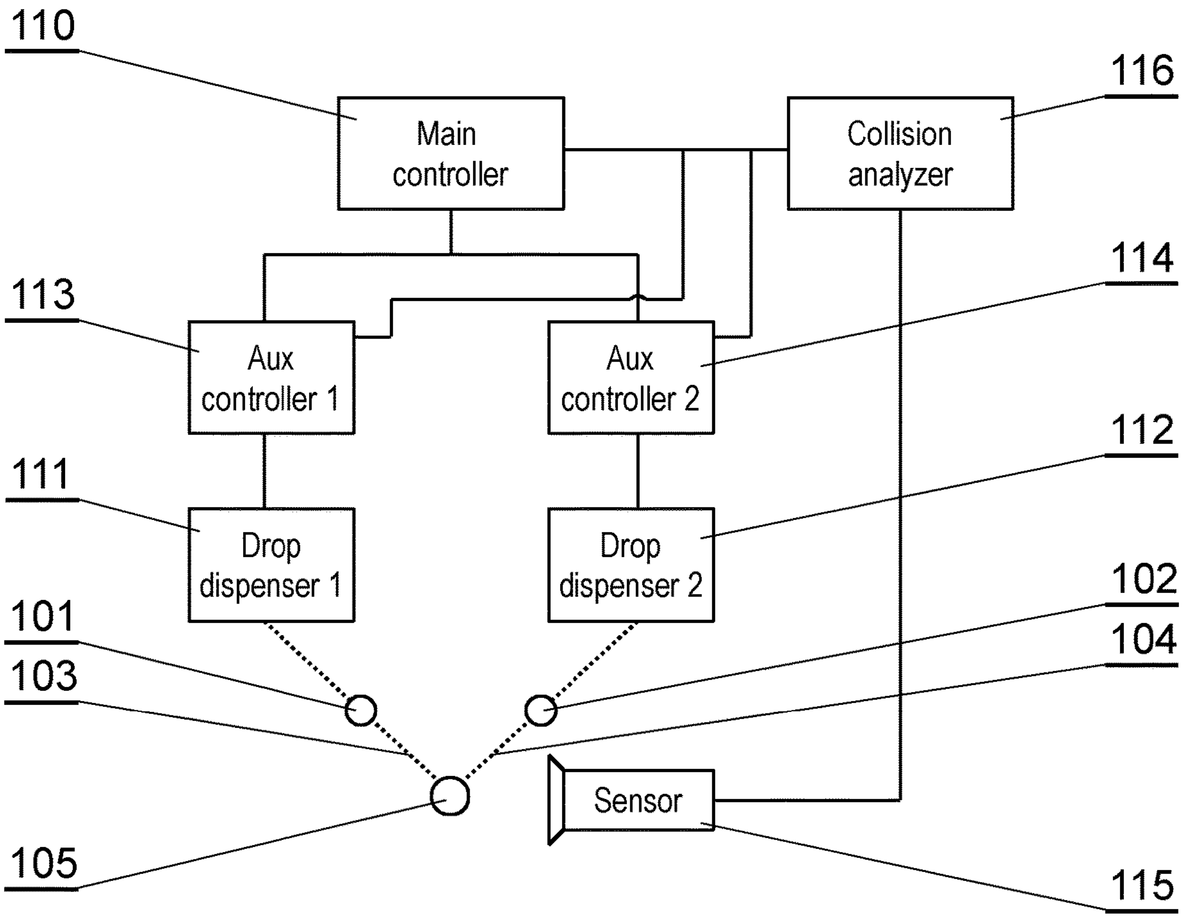
FIG. 1 shows a system for controlling the coalescence process.
Figure 2A:
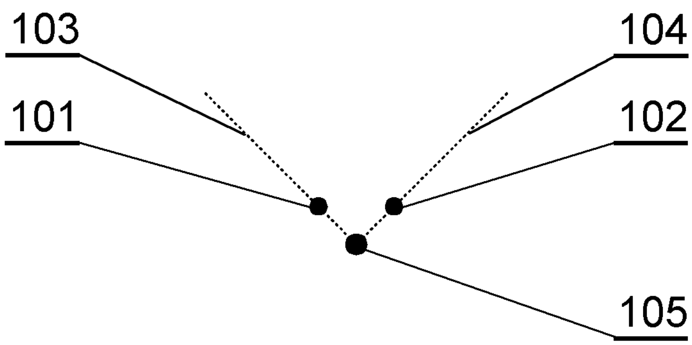
FIGS. 2A-2C show examples of collisions between drops.
Figure 2B:
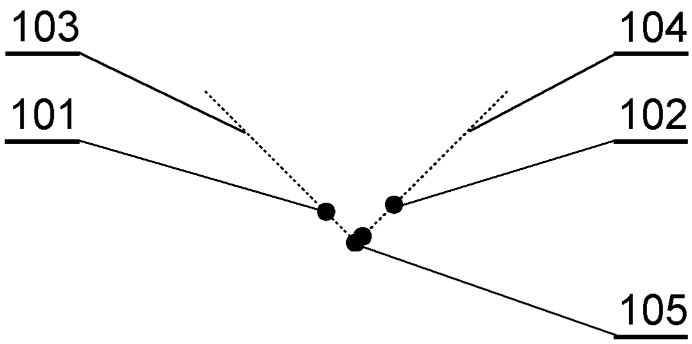
Figure 2C:
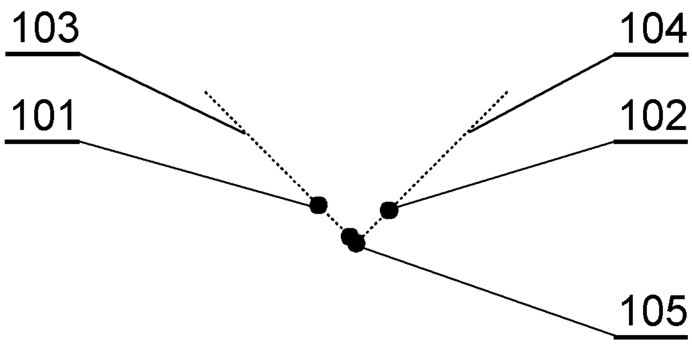

A system for which the method according to the invention is applicable is shown in FIG. 1. The system comprises a main controller 110 that controls two drop dispensers 111, 112. A first primary drop 101 is discharged from the first dispenser 111 and moves along a first path 103 and a second primary drop 102 is discharged from the second dispenser 112 and moves along a second path 104 that crosses with the first path 103. At the crossing point the drops may collide and form a combined drop 105 or be subject to other phenomena, depending on the nature of the liquids from which the drops are formed (for example, the drops may bounce, separate with satellite drops or fragment into smaller drops).

Various factors may affect the paths of flight 103, 104 and properties of drops 101, 102, such that the real path of the drop may deviate from the expected one. For example, ambient environment parameters: humidity, temperature, pressure. Moreover, the actual properties of liquid, e.g. density or viscosity, may deviate from expected properties. Moreover, the drop dispensers may change their operation in course of the printing process, for example if the level of the ink drops due to printing, the hydrostatic pressure at the end of the dispenser changes. Moreover, the drop dispensers 111, 112 may be subject to wear (for example, they may become partially clogged by the liquid material solidifying on the discharge opening) and the parameters of drops may vary as well.

Consequently, the drops may become shifted with respect to each other and not collide centrally as planned or the crossing point of the paths of flight may become shifted. This may result in collisions that do not conclude as planned (for example, a path of the combined drop may shift from the expected path) or the drops may even not collide at all.

A sensor 115, such as a camera, is provided to observe an area in which the collision of the drops is expected to occur. For example, the camera can be a stroboscopic camera or generally a camera having a sufficiently high shutter speed. The sensor 115 measures the trajectories and velocities of the drops and checks if the collision has occurred. For example, it captures an image at the time of collision (or captures a sequence of images and selects the one on which the collision is best visible or calculates whether the collision has occurred from drop parameters measured by previous images). That measurement is sent to a collision analyzer 116 that examines whether the collision was effected as planned and if not, what was the possible cause of deviation from expected collision. If a cause of problem is determined, the analyzer 116 sends a signal to the main controller 110 and/or to auxiliary controllers 113, 114 of the drop dispensers 111, 112 to correct the drop generation parameters such as to improve the collision parameters to bring them closer to expected. Therefore, the system operates in a feedback loop.

For example, the system may be used for controlling a printing head such as described in PCT applications WO2016135294 or WO2016135296.

For example, the first liquid that forms the first primary drop may comprise a first polymer-forming system (preferably, one or more compounds such as a monomer, an oligomer (a resin), a polymer etc., or a mixture thereof) and the second liquid that forms the second primary drop may comprise a second polymer-forming system (preferably, one or more compounds such as a monomer, an oligomer (a resin), a polymer, an initiator of a polymerization reaction, one or more crosslinkers etc., or a mixture thereof). A chemical curing reaction is initiated between the component (s) of the first liquid forming the first primary drop and the component(s) of the second liquid forming the second primary drop when the primary drops coalesce. The chemical curing reaction may be a polyreaction or copolyreaction, which may involve crosslinking, such as polycondensation, polyaddition, radical polymerization, ionic polymerization or coordination polymerization. In addition, the first liquid and the second liquid may comprise other substances such as solvents, dispersants etc.

Alternatively, the liquids may be inks of different colors.

Alternatively, the liquids may be liquids that detonate when in contact with each other.

For all these applications, for precise control of the printing process it is important that the collision is effected as planned: the primary drops shall meet at the specified point at specified time.

Figure 3:
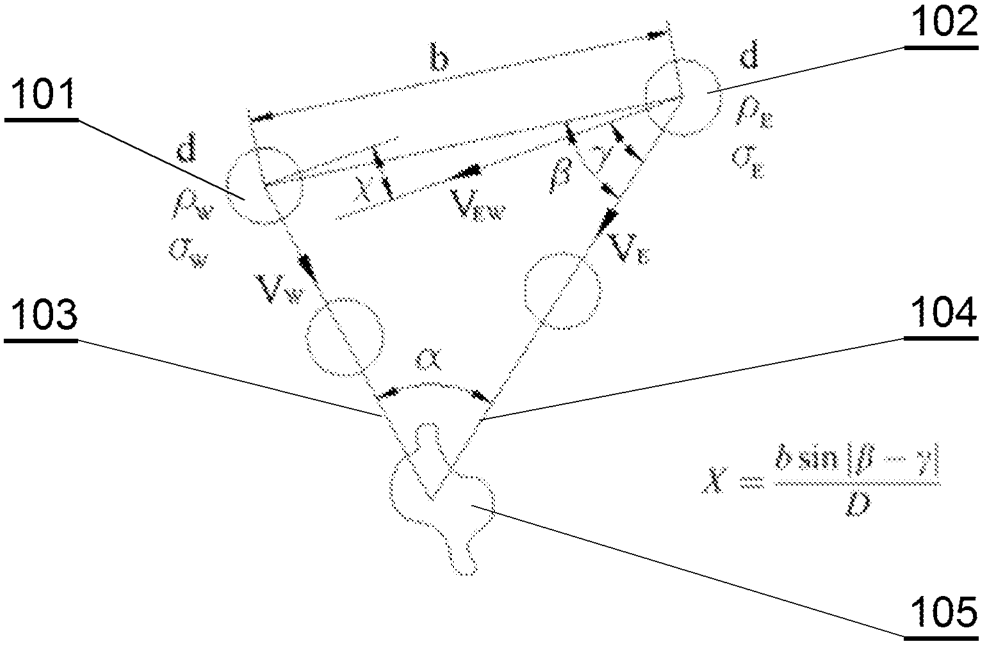
FIG. 3 shows calculating geometrical parameter X.

The collision analyzer may operate according to a predefined algorithm that analyzes typical collision errors. These can be detected by measuring collision parameters, such as a geometrical parameter X as described in "Collision between an ethanol drop and a water drop" (by T.-C. Gao et al, Experiments in Fluids, June 2005, Volume 38, Issue 6, pp 731-738) and shown in FIG. 3.

For example, if the image shows that the first drop arrived at the crossing point later than the second drop, the time of discharge of the following first drop may be adapted so as to discharge it earlier than planned. For example, if the image shows that the first drop is smaller than expected, the dispenser of the first drop may be controlled to generate the next first drop that is larger. For example, if the combined drop, after collision, travels along a path that is shifted with respect to the expected path, the speed with which one of the drops is discharged may be changed.

Figure 4:
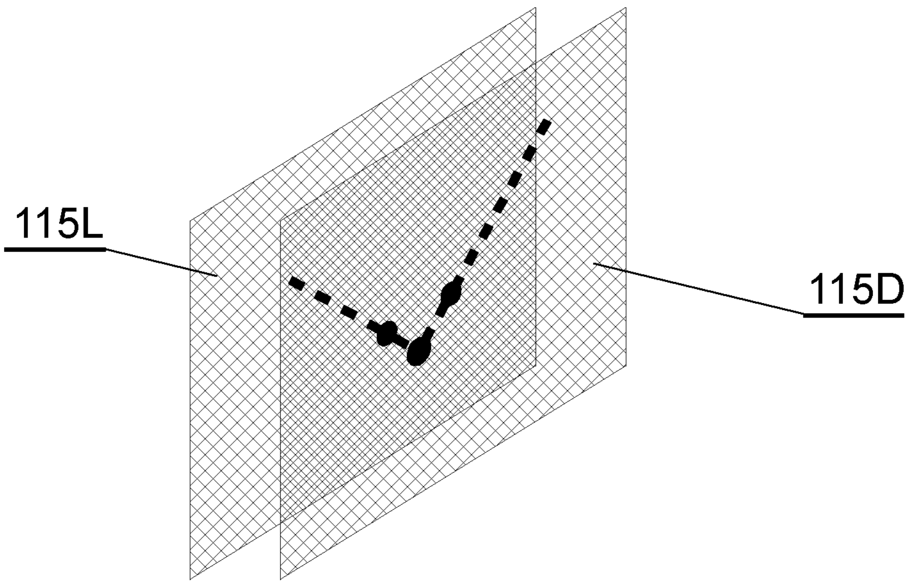
FIG. 4 shows an example schematic arrangement of lasers and detectors.

Other sensors 115 can be used as well, for example an array of lasers 115L located at one side of the plane of flight of the drops and an array of detectors 115D located opposite that plane and configured to detect the change of light intensity received from the lasers as the moving drops alter the line of sight between the lasers and detectors and as the combined drop forms. An example schematic arrangement of the lasers and detectors is shown in FIG. 4.

Furthermore, the paths of the moving drops can be analyzed by measuring the time at which the drops have reached certain positions, for example positions at ⅓ and ⅔ of distance between the starting point and the expected collision point, which can be estimated by the array as described before or two arrays (each located at the measurement positions) or by linear laser beams (located at the measurement positions).

Regardless of the type of sensor 115, other measurements of the collision can be performed as well, such as calculating the energetic parameter, Weber number etc.

Further, the collision may be analyzed by determining the path of flight of the combined drop—for example by checking whether the combined drop travels along a predetermined path or whether the actual path of the combined drop is deviated from the predetermined path.

Alternatively, the collision analyzer may comprise a neural network that continuously analyzes the measurements by the sensor 115, generates correcting signal and analyzes the following measurements to determine what was the effect of a particular correcting signal. The neural network may be provided in a pre-learned state and next learn further and adapt automatically to the current environment.

Moreover, the analyzer may detect satellite drops, i.e. smaller drops that are generated upon collision e.g. due to collision angle different than planned.

The measurements may be made for each collision (if the analyzer is fast enough) or for selected drops, or periodically, e.g. 1 measurement per second.

The aim of the analyzer is therefore to alter the parameters of dispensing of the drops such that the observed parameter of collided drops is kept within acceptable limits.

By controlling one parameter of dispensing of drops (e.g. a time of dispensing, speed of discharge of drop, drop size), the observed parameter of collided drops can be kept at a stable level even if other parameters of dispense change (e.g. speed of dispense, which may change e.g. due to change in pressure). For example, the parameters of drop dispensing may be altered by controlling the dispensers, such as controlling the discharge force (to control the speed of discharge) or discharge pulse duration (to control the drop size).

Moreover, the present invention allows not only to keep the observed parameter within desired limits, but also to change that limit (e.g. to change a value of parameter X from a positive value to a negative value) in order to for example control the positioning of the combined drop on the printed substrate.

The invention claimed is:

1. A method for controlling drop collisions in a drop on demand printing apparatus, comprising:

discharging a first drop from a first dispenser to move along a first path;

discharging a second drop from a second dispenser to move along a second path that crosses with the first path at a cross point such that the drops are expected to collide to form a combined drop;

examining the cross point against a pre-determined criteria to determine whether the collision was effected as expected; and if the result of the examination step determines that the collision was not effected as expected, altering the parameters of discharging of the first and second drops from the first and second dispensers, respectively.

2. The method of claim 1, wherein the cross point is examined by capturing an image of the combined drop.

3. The method of claim 2, wherein the image is captured by stroboscopic camera.

4. The method of claim 1, wherein the cross point is examined by at least one laser and at least one detector configured to have a path for light therebetween and configured to determine whether there is a change in intensity of light emitted by the at the least one laser as a result of the combined drop.

5. The method of claim 1, wherein the examination includes analyzing at least one of geometrical parameter of combined drop or a Weber number.

6. The method of claim 1, wherein the examination includes analyzing a path of flight of the combined drop.

7. The method of claim 1, further comprising altering at least one of time of discharge of either or both of first and second drops, speed of discharge of either or both of first and second drops, or size of either or both of first and second drops.

8. A system for controlling drop collisions in a drop on demand printing apparatus, comprising:

a first dispenser controller for controlling a first dispenser for discharging a first drop to move along a first path;

a second dispenser controller for controlling a second dispenser for discharging a second drop to move along a second path that crosses with the first path at a cross point such that the drops are expected to collide and form a combined drop; and a collision analyzer configured to:

examine the cross point against a pre-determined criteria to determine whether the collision was effected as expected; and alter the parameters of either or both the first and second dispenser controllers if the result of the examination does not meet the pre-determined criteria.

9. A method for controlling drop collisions in a drop on demand printing apparatus, comprising:

discharging a first drop from a first dispenser to move along a first path;

discharging a second drop from a second dispenser to move along a second path configured to collide with the first path at a cross point to form a combined drop;

inspecting the cross point against a pre-determined criteria;

invoking a protocol based on a result of the inspection; and if the result of the inspection does not meet the pre-determined criteria, the protocol step comprises altering the parameters of discharging of the first and second drops from the first and second dispensers, respectively.

10. The method of claim 9, wherein the cross point is inspected by capturing an image of the combined drop.

11. The method of claim 10, wherein the image is captured by stroboscopic camera.

12. The method of claim 9, wherein the cross point is inspected by at least one laser and at least one detector configured to have a light path therebetween and configured to determine whether there is a change in intensity of light emitted by the at the least one laser as a result of the combined drop.

13. The method of claim 9, wherein the inspection includes analyzing at least one of geometrical parameter of combined drop or a Weber number.

14. The method of claim 9, wherein the inspection includes analyzing of a path of flight of the combined drop.

15. The method of claim 9, further comprising altering at least one of time of discharge of either or both of first and second drops, speed of discharge of either or both of first and second drops, or size of either or both of first and second drops.

16. A system for controlling drop collisions in a drop on demand printing apparatus, comprising:

a first dispenser controller for controlling a first dispenser for discharging a first drop to move along a first path;

a second dispenser controller for controlling a second dispenser for discharging a second drop to move along a second path configured for collision with the first path at a cross point to form a combined drop;

a collision analyzer configured to:

inspect the cross point against a pre-determined criteria;

invoke a protocol based on a result of the inspection; and alter the parameters of either or both the first and second dispenser controllers if the result of the inspection does not meet the pre-determined criteria.

* * * * *